Patented June 17, 1947

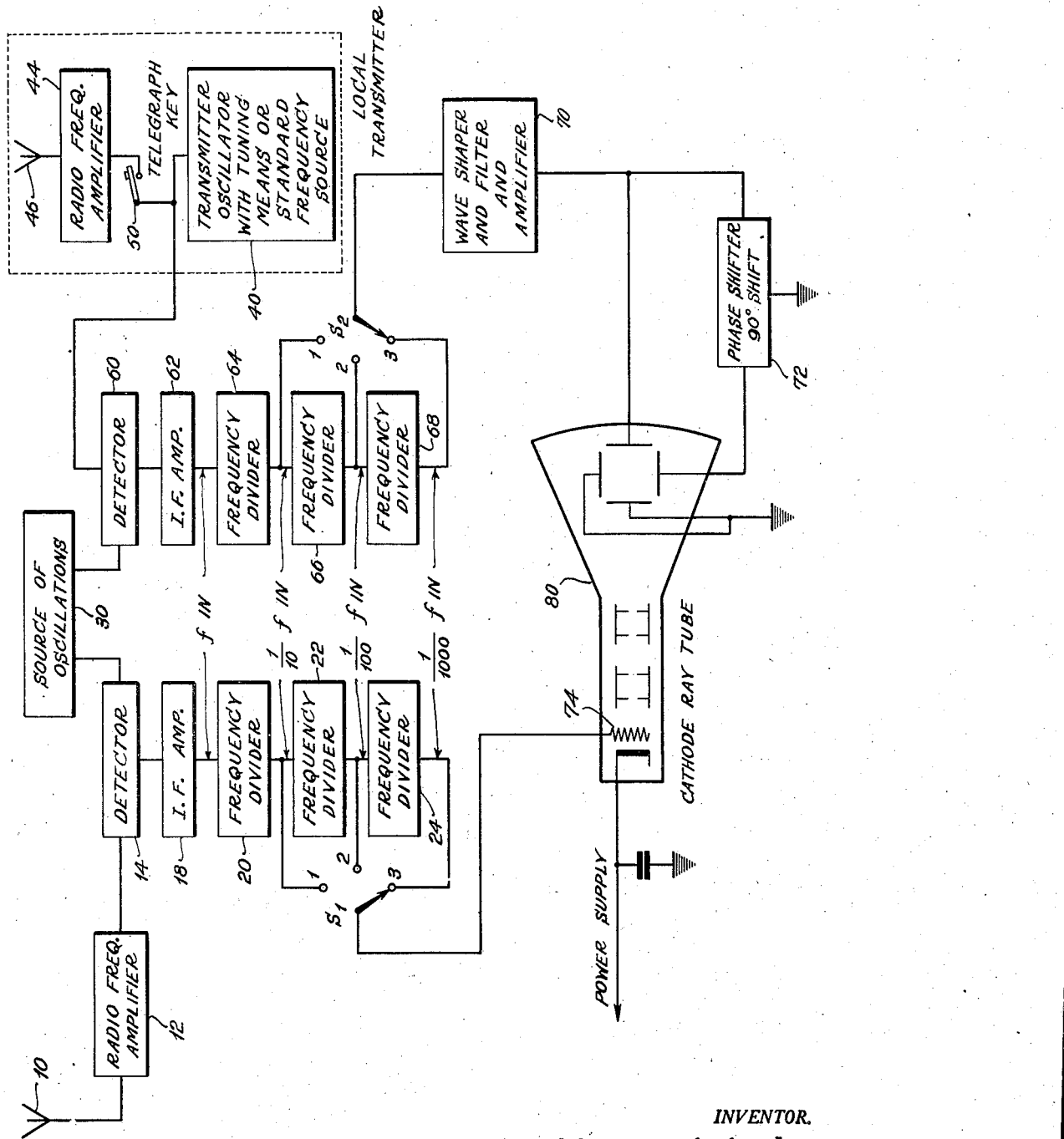

2,422,386

UNITED STATES PATENT OFFICE 2,422,386

FREQUENCY MEASUREMENT

Warren A. Anderson, West Brighton, Staten Island, N. Y., assignor to Radio Corporation of America, a corporation of Delaware Application November 22, 1943, Serial No. 511,267

15 Claims. (Cl. 250—39)

In the field of frequency measurement there has long been a need for an accurate method and means of comparing two frequencies on the basis of their frequency difference. The present application discloses an improved method and means of frequency measurement, and more specifically of comparing the frequencies of two sources of wave energy.

This method and means involves comparing the frequencies of the two waves and producing an indication of the relative frequencies of the two waves.

An object of this invention is to provide such a method and means, wherein it is possible by simple means to vary the sensitivity of the system and thereby the accuracy, to which the indicating system can be read in a given period of time.

In systems known heretofore, in general, a local source of oscillations of fixed and known frequency is used and compared with wave energy from the source of unknown frequency to thereby determine the difference frequency and as a consequence, determine the frequency of the wave energy from the unknown source. In such systems the accuracy and reliability depends on several factors including the stability of what is known in the art as a local standard source, that is, a source of wave energy of fixed known frequency.

An object of my invention is to provide frequency measuring and comparing means of this general type, wherein the accuracy of the reading is only dependent on the local standard and is independent of any other equipment used prior to the actual indicator.

In my system, the two waves to be compared are beat with oscillations from a local source and the beat notes compared. If the local source frequency changes both beat notes change like amounts, so that changes in the frequency of this local source do not effect the accuracy of the system.

Thus, where it is desired to tune one source to the frequency of the other source rather than to determine the exact frequency of one source (the other frequency being known to an approximate degree) my system is very useful. Moreover, since the source used for comparison purposes need not be of fixed frequency but may be a normally fairly constant source this is of considerable advantage because it is fairly simple to provide such a source.

A further object of my invention is to provide a system as described briefly hereinbefore, where- in the accuracy of the indication is not affected by comparatively short interruptions of the frequency to be measured or compared. For example, my system functions as well on either a telegraphy keyed signal or a telephone modulated signal, as it does on unmodulated wave energy.

Many of the measuring and comparing systems known in the art do not indicate whether the standard frequency wave is above or below the frequency of the wave of unknown frequency, that is, do not provide a "sense" indication.

An object of my invention is to provide in a system of this type an indicator which not only indicates the relative difference frequency, but also indicates to the operator whether the local frequency standard is high or low with respect to the measured frequency and not simply that there is, for example, a few cycles difference in frequency.

The need of measuring or comparing method and means, as outlined briefly above, will be apparent if the systems of this type known in the art are considered. For purposes of illustration, let it be assumed that it is desired to place a local radio transmitter exactly on the frequency of a distant transmitter. Such operation might be desired, for example, for the purpose of jamming an enemy transmitter. In this case the conventional method has been to beat wave energy from the enemy transmitter (in this example, the wave energy source of unknown frequency) with oscillations from the local transmitter (in this example the standard source) until an audible beat note can be heard in a radio receiver. The local transmitter tuning is then further adjusted, mostly by skill derived from practice, until this beat note is brought to what is believed to be zero frequency at which time it is known that the local transmitter is on the distant enemy frequency and the desired jamming effect is attained. This process is both lengthy and difficult, particularly since an audible beat note does not per se, convey "sense," that is, show whether the local transmitter frequency is above or below the enemy transmitter frequency. Furthermore, as soon as the beat note reaches the sub-audible limit there is no further information as to the relative frequencies by which the operator may be guided in the further tuning of the local transmitter.

The method and means of comparison herein disclosed is not subject to the above limitation and at the same time indicates the sense of the difference frequency.

The manner in which the above objects are attained and other objects and the manner in which the same are attained will appear from the detailed description which follows. In this description reference will be made to the attached drawings wherein I have illustrated diagrammatically and mostly by rectangles a frequency measuring or comparing system arranged in accordance with my invention.

In the drawings, 10 is a pickup such as an aerial, coupled with the radio frequency amplifier 12 which amplifies wave energy and supplies it to a mixer and detector in 14. 14 is also excited by oscillations from a local source 30. The stage 14 has by virtue of its inherent characteristics frequency components in its output equal to the difference between the input frequencies from 12 and 30, and merely for purposes of illustration, let it be assumed that this difference frequency is of the order of 500 kilocycles.

The intermediate frequency filter 18 is arranged and dimensioned so that it has a band pass of essentially 10 kilocycles centered about a nominal value of 500 kilocycles.

The output of the filter 18 is supplied to a chain of three frequency dividers, 20, 22 and 24, of any well known conventional type having the desired characteristics, described in detail hereinafter. Each of these dividers in the example given is assumed to have a factor of 10, that is, have an output frequency which is one-tenth of the input frequency. Thus, the output frequency of divider 20 is 50 kilocycles, the output frequency of divider 22 is 5 kilocycles, and the output frequency of divider 24 is 500 cycles.

The circuit for the local transmitter, or standard source, half of the system is essentially the same. This source here has been shown as a transmitter oscillator or standard frequency source, as indicated in the rectangle 40. Furthermore, this source is used in the example given above, that is, to send out messages and/or jamming signals. It may be connected to a radio frequency amplifier 44 and a radiator 46 through a key 50. All of these parts are shown diagrammatically and by rectangles since the same, per se, form no part of the present invention. Any well known source of oscillations may be used at 40 and the oscillations keyed as they are relayed to amplifiers in the stage 44.

The output from this transmitter or oscillator or standard frequency source is supplied to detector 60, wherein it is beat with oscillations from the source 30 and supplied to an intermediate frequency filter 62 which may be similar to the filter 18. The output of this filter is fed to a second series of dividers 64, 66 and 68, which may operate in a manner substantially identical to the manner in which the dividers 20, 22 and 24 operate. As a matter of fact, the two series of dividers may be identical. There is now at the outputs of 24 and 68 two audio frequency tones available, the difference between which tones is directly proportional to the difference between the received signal frequency and the local frequency standard, that is, the frequency of 40. Mathematically this may be expressed:

Audio freq.$_1$ − Audio freq.$_2$ = $K$ (radio freq.$_1$ − radio freq.$_2$)

Where $K$ is equal to the reciprocal of the division performed by the dividing stages.

The method of comparing the two frequencies at 10 and 40 is to take the output of one of the divider stages 64 or 66 or 68 and shape it until it approximates a sine wave. This shaped voltage is applied to both the vertical and horizontal deflection plates of a cathode ray tube. One set of deflection plates, say the vertical plates, is energized through a phase shifter which introduces a 90° phase shift. Thus a revolving electric field is established and the normal pattern on the screen or target of the tube will be a circle. The output of the corresponding one of the divider stages 20, or 22 or 24, normally of pulse formation is fed to the grid of the cathode ray tube. These pulses modulate the tube beam either turning it on or off to produce a rotating spot, the angular velocity of which is proportional to the frequency difference and "sense."

To permit the sensitivity of the system to be changed the grid 74 is coupled to switch S1 having three contacts connected to the outputs of the dividers 20, 22 and 24. A similar switch S2 couples the dividers 64, 66 and 68 to the filter and amplifier 70. The output of 70 is fed directly to the horizontal plates and through phase shifter 72 to the vertical plates.

Now assume switches S2 and S1 are in the positions shown. The output of the divider 68 is fed to contact 3 of a switch S2 and thence by way of a filter and amplifier 70 to two plates of the cathode ray tube 80. In one of the paths between the filter 70 and one of the pairs of plates is included means 72 for shifting the phase of the voltage supplied by about 90° with respect to the voltage supplied to the other plates. This phase shifter at 72 may be of any well known type.

The output of the divider 24 is supplied to the #3 contact of a switch S1, and thence to the control grid 74 of the cathode ray tube 80. The cathode ray tube itself is conventional.

The nature of frequency dividers such as used at 20, 22, 24, 64, 66 and 68 is such that their outputs are of pulse or other wave form. Preferably, I use dividers at 20, 22 and 24, which provide pulse wave form output and at 64, 66 and 68 dividers which give essentially either square or sawtooth wave form outputs.

In the amplifier and filter 70 I form the output of this series of dividing networks until it approximates a sine wave. For example, the filter 70 excited by the output of the frequency dividers 64, or 66 or 68 may comprise a plurality of parallel broadly tuned circuits cascaded in series by separating resistances. These circuits will convert the triangular or square wave form currents into currents of sine wave form. Means is also included for switching additional condensers into or out of the circuit when the frequency of the input to 70 is changed by moving switch S2 to the different positions to excite 70 by the ouput of 64 or 66, or 68.

The sine wave former and filter 70 may also comprise an R. C. wave shaping network including a plurality of variable shunting condensers and series resistances which are variable and the necessary amplifier stages. The input waves are converted to sine waves. The fundamental wave is amplified. This sine wave voltage proportional to the frequency of the beat note between 30 and 40 is supplied to the vertical and horizontal deflection plates (or field windings if desired) of the cathode ray tube 80 in quadrature. Thus the normal pattern on the tube target or screen is a circle, since by this means I have provided around the electron beam path a revolving electrostatic or electromagnetic field.

The output of one of the stages, say 24, which is normally of a pulse formation, is coupled to the control grid 74 of the cathode ray tube. These dividers and those in 64, 66 and 68 may be of any type, multivibrator, counter circuit, relaxation oscillator, blocking oscillator, etc. The pulses out of divider 24 on the grid 74 modulates the electron beam within the tube, thus turning it either on or off as desired. For example, I may bias the grid of this tube negative by means included in the stages 20, 22 or 24, whichever is connected to the grid through switch S1, and supply thereto wave energy the pulse wave form of which is such that the short pulses are in a positive direction. The tube electron beam is then shut off for most of the time and is turned on at the peaks of the short pulses applied to 74 to provide on the oscilloscope face a spot having a circular orbit.

On the other hand, the control grid 74 may be biased less negative so that the electron beam is normally on and follows a circular path on the target. In this case the wave form out of the dividers is in a sense inverted (as compared to the wave discussed in the preceding paragraph) so that the pulses are in a negative direction so that they cut off the ray on the peaks only of the wave. In this case, there is a break in the circular path traced by the beam which occurs when the beam is shut off, and this break is observed in operating the system.

Now assume that the system is operating and the switches S2 and S1 are in the position shown, that is, on #3 contacts, and further, that the grid of the tube 70 is biased to cut off, the peaks of the pulses are positive, and each peak or pulse from the dividing stage 24 turns the beam on, thereby producing a spot on the target or screen of the cathode ray tube. If the switches S2 and S1 are in the respective positions shown, the spot appearing on the screen or target of the tube will seem to revolve about a path established by the revolving electrostatic field, provided the frequencies out of 24 and 68 are substantially the same, which in turn indicates that the frequencies at 12 and 40 are substantially the same. The rate at which this spot traverses its orbit will be directly proportional to the difference between the received frequency at 12 and the local frequency at 40. However, since the dividers are set to the $1/1000$ position, one revolution of the spot per second indicates an actual frequency difference of 1 kilocycle, and the direction of rotation of the spot either to the right or left indicates the "sense" of the frequency difference. For instance, by properly poling the connections of the deflection plates and their respective phases of excitation, a rotation of the spot to the right may be made to indicate that the local oscillation in 40 is of a frequency higher than the frequency of the received signal at 12. On the other hand, a rotation of the spot on the screen to the left indicates that the frequency of the oscillator in 40 is lower than the frequency of the wave energy in 12. In this manner a primary object of my invention is provided since a "sense" reading or a "sense" indication is produced.

If for some reason it is desirable to increase the sensitivity of the system, all that is necessary is to turn the switches S and S1 to the #2 position so that a factor of division of 100 is used, that is, the switches are in the $1/100$ position. In this case, each revolution per second of the spot indicates a frequency difference of 100 cycles between the source at 40 and the wave at 12, that is, we now multiply the number of revolutions by 100 instead of 1000, and obviously, a greater degree of accuracy and sensitivity is obtained, this being a further object of my invention. The accuracy and sensitivity is in a similar manner further increased by moving the switches S2 and S1 to the #1 contacts so that each revolution of the spot per second indicates a 10 cycle difference between the frequency of the wave at 40 and the frequency of the wave at 12.

Referring now to the operation of the system when the switches S2 and S1 are on any of the corresponding contacts, say #3, and it is desired to bring the source 40 exactly in synchronism with the source 12, say for the purpose of transmitting at 46 a jamming wave, the operator will tune 40 slowly while he observes the target of the cathode ray tube 80 and the tuning will be in such a direction as to slow up movement of the spot on the target. As stated above, when starting the operation the operator knows instantly from the direction of movement of the spot which direction he must tune 40 to approach the frequency of 12 since the system gives a "sense" indication. When the spot is brought to a stationary position the source 40 is in synchronism with the source 12.

It should be noted here that in the prior systems where aural indications are used it might take several seconds for the operator to become aware of the fact that the source 40 is in synchronism with the source 12, because of the fact that the beat notes aurally observed cannot be counted so rapidly and also of the fact that when the beat note becomes very slow it may be inaudible.

In my system it is merely a matter of judging the rate of travel of the spot and of bringing the same to a standstill and one makes this observation almost instantly.

Moreover, my system provides a "sense" indication so that there is no tuning of the source 40 in the wrong direction. On ordinary standard cathode ray tubes an operator can readily count 5 to 7 revolutions per second. With a tube arranged for use in this system an operator would be able to increase the rate of observation considerably.

I claim:

1. The method of comparing the frequencies of two waves which includes these steps, beating both of said waves with oscillations, selecting two beat notes resulting from said two beating actions, producing by means of one of said beat notes a field the rate of rotation of which is a function of the frequency of said one beat note, producing by means of said other beat note an indication which occurs at least once per cycle of the other beat note, and indicating the timing of said indication as compared to the position of rotation of said field.

2. The method of comparing the frequencies of two electrical waves which includes these steps, beating both of said waves with oscillations, selecting a beat note resulting from each of said beating actions, producing an electron stream, interrupting the flow of said stream at least once each cycle of one of said beat notes, and producing by means of said other beat note an electron stream deflecting and rotating field about the path of said stream to provide a visual indication of the time at which the stream is interrupted as compared to the position of rotation of the field.

3. The method of comparing the frequencies of two electrical waves which includes these steps, beating both of said waves with oscillatory energy, selecting two beat notes of the same order of frequency resulting from said two beating actions, dividing the frequencies of each beat note by the same factor to obtain two electrical waves of lower frequencies, producing by means of one of said electrical waves of lower frequency a field the rate of rotation of which is a function of the frequency of said one of said waves, producing by means of said other electrical waves of lower frequency an indication which occurs at least once per cycle of the said other electrical wave, and indicating the timing of said indication as compared to the position of rotation of said field.

4. The method of comparing the frequencies of two electrical waves which includes these steps, beating both of said waves with oscillations, selecting two beat notes resulting from said beating action, deriving from one of said beat notes wave energy of the said beat note frequency and of sine wave form, deriving from the other of said beat notes wave energy of pulse wave form, producing by means of said wave energy of sine wave form a rotating electrical field and producing by means of said wave energy of pulse wave form an indication related to the position of rotation of said field as the frequency of said wave energy of pulse wave form is related to the frequency of said wave energy of sine wave form.

5. The method of comparing the frequencies of two electrical waves which includes these steps, beating both of said waves with oscillatory energy, selecting two beat notes of the same order of frequency resulting from said two beating actions, dividing the frequencies of each beat note by the same factor to obtain two electrical waves of pulse wave form and of lower frequencies, producing by means of one of said waves of pulse wave form wave energy of sine wave form and of the same frequency, producing by means of said wave energy of sine wave form a field the rate of rotation of which is a function of the frequency of said wave of sine wave form, producing by means of said other wave of pulse wave form an indication which occurs at least once per cycle of the said other wave of pulse wave form and indicating the timing of said indication as compared to the position of rotation of said field.

6. The method of comparing the frequencies of two electrical waves of the same order of frequency in a cathode ray tube having an electron stream producing element, a control grid and angularly related electron of stream deflecting elements which includes these steps, beating both of said waves with oscillatory energy, selecting a beat note resulting from each of said beating actions, applying one of said beat notes to said control grid to interrupt the flow of said stream at least once each cycle of one of said beat notes, applying the other beat note to said electron stream deflecting elements in quadrature to deflect said electron stream and cause the same to rotate in a closed path at a rate which is a function of the frequency of said other beat note, which stream is interrupted at least once per cycle of said one beat note to provide a visual indication of the rate of rotation.

7. The method of comparing the frequencies of two electrical waves of the same order of frequency in a cathode ray tube having an electron stream producing element, a control grid and angularly related electron stream deflecting elements which includes these steps, beating both of said waves with oscillatory energy, selecting a beat note resulting from each of said beating actions, dividing the frequency of each beat note by the same factor to obtain two electrical currents of the same order of frequency, applying one of said currents to said control grid to interrupt the flow of said stream at least once each cycle of said one of said electrical currents, applying the other of said currents to the electron stream deflecting elements in quadrature to deflect said stream so that it rotates in a closed path at a rate which is a function of the phase relation of the other currents on the deflecting elements, which stream is interrupted at least once per cycle to provide a visual indication of the rate of rotation.

8. The method of comparing the frequencies of two electrical waves of the same order of frequency in a cathode ray tube having an electron stream producing element, a control grid and electron stream deflecting elements which includes these steps, beating both of said waves with oscillatory energy, selecting a beat note resulting from each of said beating actions, dividing the frequency of each beat note by the same factor to obtain two electrical currents of the same order of frequency, applying one of said currents to said control grid to interrupt the flow of said stream at least once each cycle of one of said electrical currents, producing by means of the other of said currents a current of sine wave form, applying said current of sine wave form to the said electron stream deflecting elements in quadrature to produce in said tube an electron stream which rotates at a rate which is a function of the frequency of said current of sine wave form and in a direction which depends on the relative frequencies of said currents which stream is interrupted at least once per cycle to provide a visual indication of the rate of rotation.

9. The method of comparing the frequencies of two electrical waves of the same order of frequency which includes these steps, beating both of said waves with oscillatory energy, selecting a beat note resulting from each of said beating actions, dividing the frequency of each beat note by the same factor to obtain two electrical currents of the same order of frequency, producing an electron stream, interrupting the flow of said stream at least once each cycle of one of said electrical currents, and producing by means of said other electrical current an electron stream deflecting and rotating field about the path of said stream to provide a visual indication of the time at which the stream is interrupted as compared to the position of rotation of the field.

10. In apparatus for comparing the frequencies of two electrical currents of the same order of frequency, a source of oscillatory energy, two wave mixers and detectors coupled to said source of oscillatory energy, connections for impressing one of said currents on one of said mixers and detectors, connections for impressing the other of said currents on the other of said mixers and detectors, a cathode ray tube having a stream producing electrode, a stream control electrode and two electron stream deflecting elements, a coupling between one detector and the control grid of said cathode ray tube, separate paths between the other detector and each of said two deflecting elements, and a phase shifter in one of said paths.

11. In apparatus for comparing the frequencies of two electrical currents of the same order of frequency, a source of oscillatory energy, two separate detectors coupled to said source of oscillatory energy, connections for impressing one of said currents on one of said detectors, connections for impressing the other of said currents on the other of said detectors, a cathode ray tube having a ray producing electrode, a control electrode and two pairs of electron stream deflecting elements, beat note selecting means coupled to each of said detectors, pulse wave forming means coupling one selecting means to the control grid of said cathode ray tube, a filter coupled to the other selecting means, said filter having an output coupled by separate paths to each pair of deflecting elements, and a phase shifter in one of said paths.

12. In apparatus for comparing the frequencies of two electrical currents of the same order of frequency, a source of oscillatory energy, two detectors coupled to said source of oscillatory energy, connections for impressing one of said currents on one of said detectors, connections for impressing the other of said currents on the other of said detectors, a cathode ray tube having a control electrode and electron stream deflecting elements, a band pass filter and beat note frequency amplifier coupled to each of said detectors, a chain of frequency dividers coupling one of said band pass filters and beat note amplifiers to the control grid of said cathode ray tube, a filter and amplifier having an input and having an output coupled by two paths to the deflecting elements, a phase shifter in one of said paths and a chain of frequency dividers coupling said other band pass filter and beat note amplifier to the input of said filter and amplifier.

13. The method of comparing the frequencies of two electrical waves of substantially like frequency, one of which is of substantially fixed frequency and the other of which is of a frequency which may vary, which includes these steps, beating both of said electrical waves with oscillations of like frequency, selecting a beat note resulting from one of said beating actions, selecting a beat note of substantially like frequency resulting from the other of said beating actions, producing an electron stream, interrupting the flow of said produced electron stream at least once each cycle of one of said beat notes, and producing by means of the other of said selected beat notes an electron stream deflecting and rotating field about the path of said stream to provide a visual indication of the time at which the stream is interrupted as compared to the position of rotation of the field.

14. The method of comparing the frequencies of two electrical waves of substantially like frequency the frequency of one of which is substantially fixed and the frequency of the other of which waves may vary, which includes these steps, beating both of said electrical waves with oscillations of like frequency, selecting from said beating actions two beat notes of substantially like frequency, deriving from one of said selected beat notes wave energy of the said beat note frequency and of substantially sine wave form, deriving from the other of said selected beat notes wave energy of pulse wave form, producing by means of said derived wave energy of substantially sine wave form a rotating electrical field, and producing by means of said derived wave energy of pulse wave form an indication related to the position of rotation of said field as the frequency of said wave energy of pulse wave form is related to the frequency of said wave energy of sine wave form.

15. The method of comparing the frequencies of two electrical waves of substantially like frequency the frequency of one of which waves is substantially fixed and the frequency of the other one of which waves may vary, which includes these steps, beating both of said waves with oscillations of like frequency, selecting two beat notes of substantially like frequency resulting from said two beating actions, producing by means of one of said selected beat notes a field the rate of rotation of which is a function of the frequency of said one beat note, producing by means of said other selected beat note an indication which occurs at least once per cycle of the said other beat note, and indicating the timing of said indication as compared to the position of rotation of said field.

WARREN A. ANDERSON.

REFERENCES CITED

The following references are of record in the file of this patent:

UNITED STATES PATENTS

| Number | Name | Date |
| --- | --- | --- |
| 2,324,915 | Dow | July 20, 1943 |
| 1,450,966 | Affel | Apr. 20, 1923 |
| 1,731,264 | Potter | Oct. 15, 1929 |
| 2,201,978 | Bedford | May 28, 1940 |